Jan. 27, 1970  R. C. PELLMAN  3,491,613
REMOTE CONTROL TRANSMISSION RATIO SHIFT LINKAGE MECHANISM
Filed March 8, 1968  5 Sheets-Sheet 1

INVENTOR:
Ronald C. Pellman
BY
ATTORNEYS.

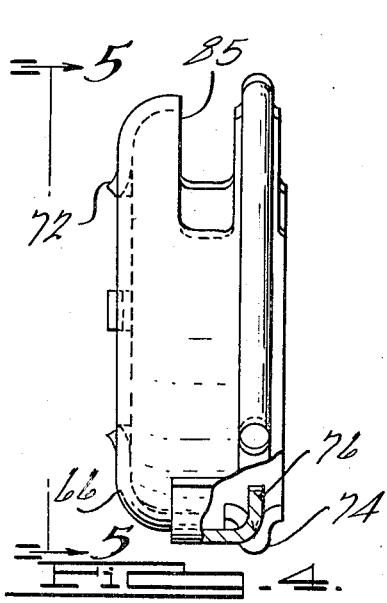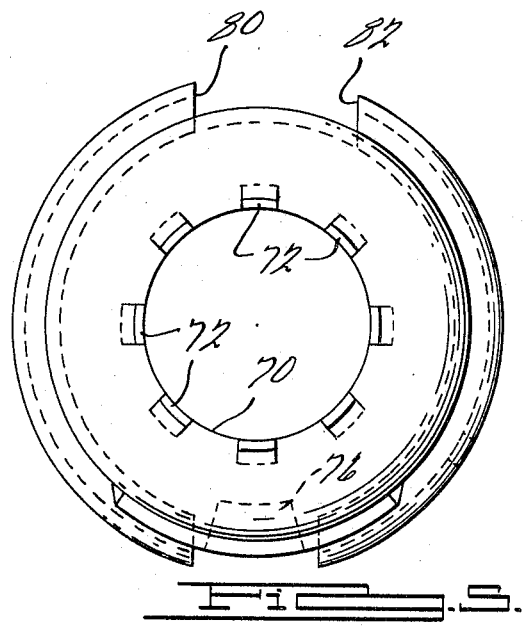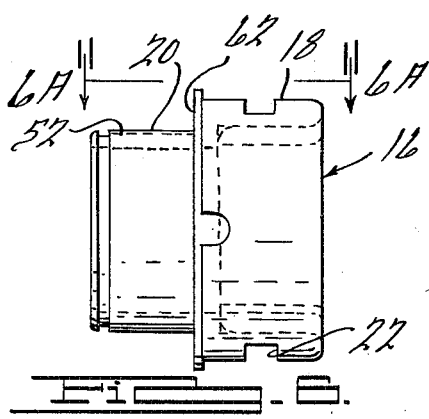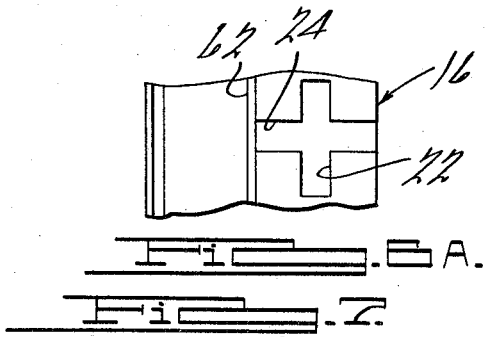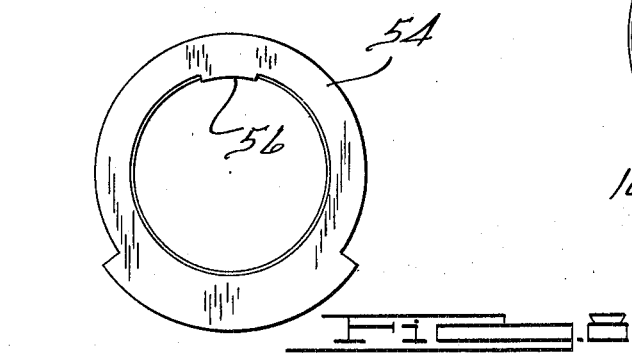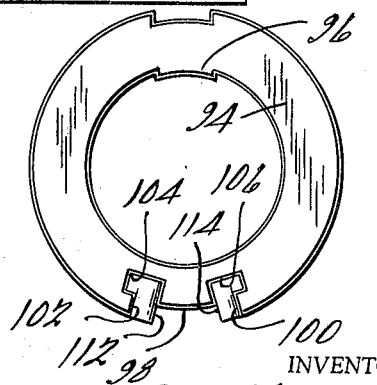
INVENTOR:
Ronald C. Pellman
BY
ATTORNEYS.

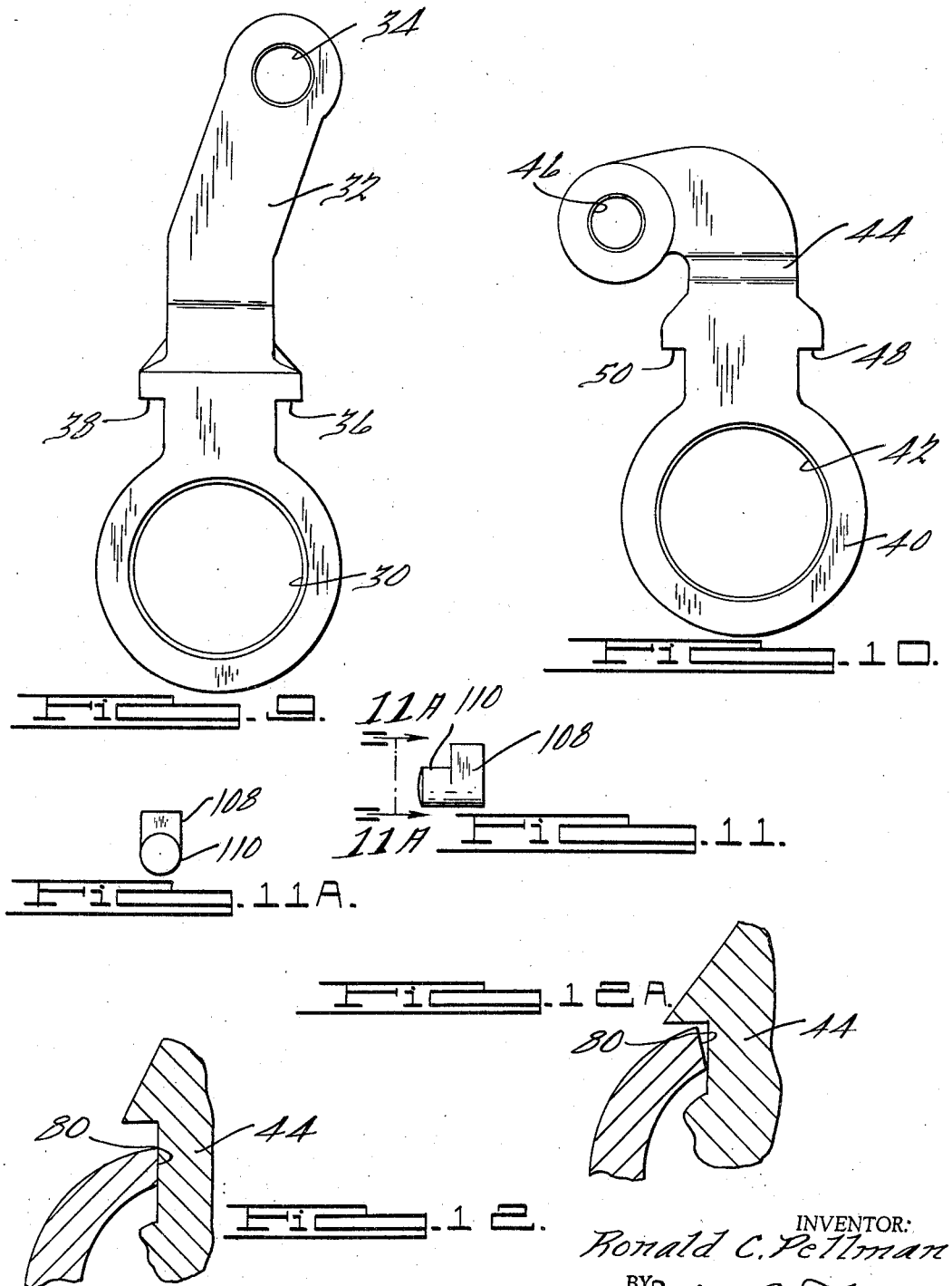

Jan. 27, 1970  R. C. PELLMAN  3,491,613
REMOTE CONTROL TRANSMISSION RATIO SHIFT LINKAGE MECHANISM
Filed March 8, 1968  5 Sheets-Sheet 5
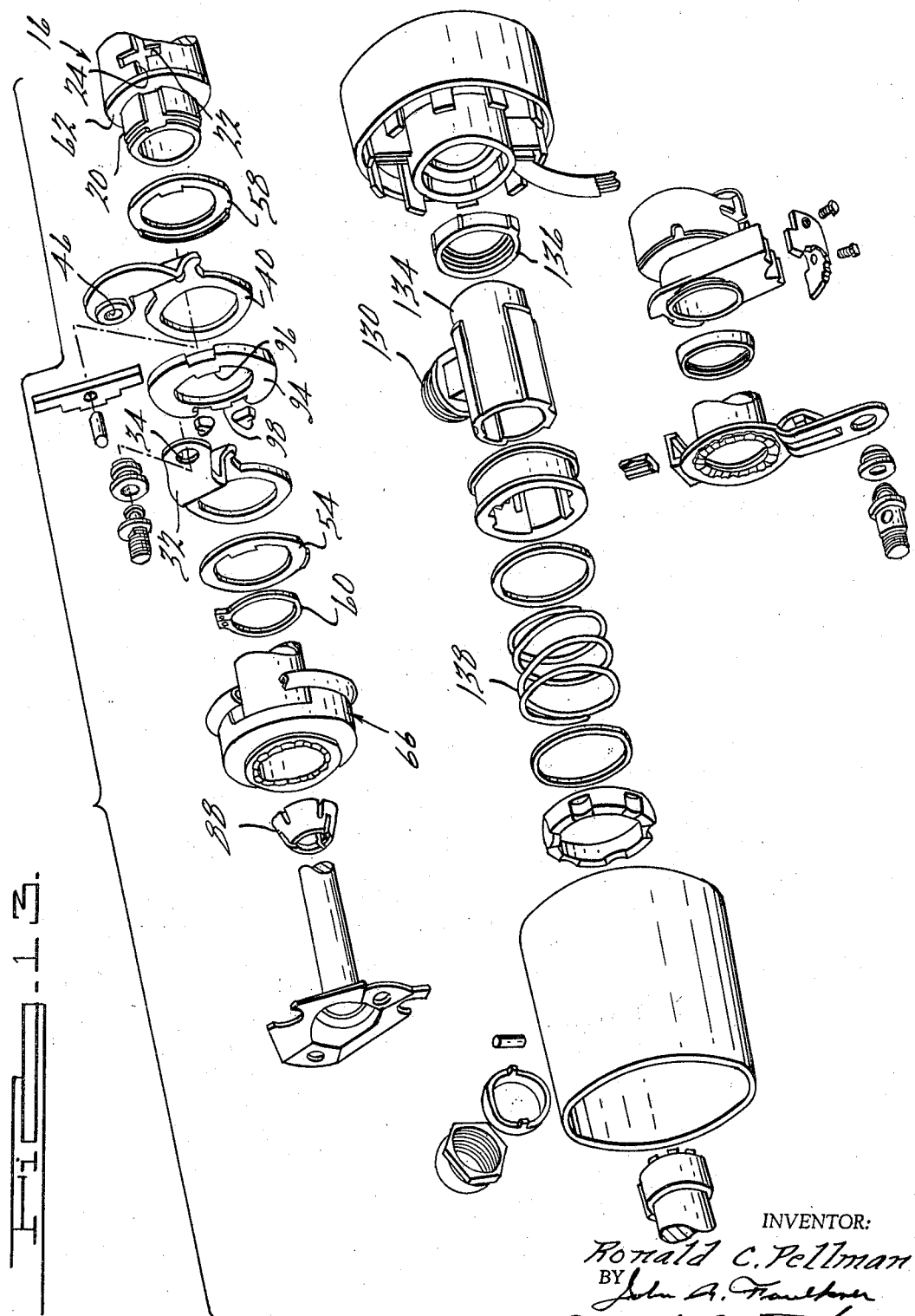
INVENTOR:
Ronald C. Pellman
BY
ATTORNEYS.

United States Patent Office 3,491,613
Patented Jan. 27, 1970

3,491,613
REMOTE CONTROL TRANSMISSION RATIO
SHIFT LINKAGE MECHANISM
Ronald C. Pellman, Dearborn, Mich., assignor to Ford
Motor Company, Dearborn, Mich., a corporation of
Delaware
Filed Mar. 8, 1968, Ser. No. 711,548
Int. Cl. G05g 9/00, 13/00
U.S. Cl. 74—484
10 Claims

ABSTRACT OF THE DISCLOSURE

This specification describes a manually controlled gear shift linkage mechanism for use in a multiple ratio power transmission in an automotive vehicle driveline. The mechanism includes a driver-controlled shift tube which is adapted for oscillation about its axis as well as for displacement in the direction of its axis. The mechanism includes also shift levers that are connected mechanically to shift control elements of the power transmission gearing in the driveline. An improved clutch means is provided for connecting selectively the shift tube with each of the levers, the latter being mounted independently of the shift tube on a relatively stationary portion of the vehicle chassis. A gate arrangement, which is isolated structurally from both the shift levers and the shift tube controls the shift pattern for the shift linkage mechanism.

BRIEF SUMMARY OF THE INVENTION

My invention relates generally to power transmission mechanisms for automotive vehicles and to a personally operable linkage mechanism for positioning appropriately transmission torque delivery elements for operation in any selected speed ratio. My improved mechanism is capable of being mounted independently of the steering column for the vehicle, although in the particular embodiment disclosed in this specification I have chosen a vehicle steering column assembly as a structural environment for my improvement.

It is usual design practice in automotive vehicle drivelines to mount a ratio shift tube around the steering shaft which extends from the vehicle passenger compartment to the forward engine compartment where the front wheel suspension system is housed. The steering shaft, the shift tube and the supporting structure are referred to as the steering column assembly. The supporting structure is usually in the form of a stationary sleeve which surrounds the shift tube and which is connected directly to the vehicle chassis.

Conventional gear shift linkage mechanisms of this type include shift levers that are journalled for oscillation about the axis of the steering shaft. These are supported by the shift tube itself. The levers in turn are connected through mechanical linkages to the shift controlling elements of the transmission gearing.

A dog clutch arrangement is used to establish selectively a driving connection between the shift levers and the shift tube. The dog clutch is designed so that during operation the engagement of the shift tube with a shift lever cannot be accomplished unless the shift tube first is moved to a so-called neutral position prior to its shifting movement in an axial direction. This neutral position, however, is determined by the relative angular displacement of the shift lever with respect to the shift tube. In such prior art arrangements, it does not depend upon the relative displacement between a fixed point on the vehicle chassis and the shift tube. Consequently, when the system is subject to wear, it is possible for the shift tube to assume a neutral position which does not correspond precisely to the neutral position of the torque transmitting gear elements in the transmission. It is possible, therefore, for the transmission mechanism to be conditioned for one ratio as the gear shift linkage mechanism is adjusted for another ratio. This locks up the transmission driveline and prevents power delivery. Under some circumstances overstressing of the driveline elements will occur and cause premature stress failure.

Such prior art arrangements are also characterized by a relatively high shifting effort. This is due to the fact that the shift levers are journalled on the shift tube itself. In addition to the rotary motion of the shift levers, the tube, because of its relationship to the levers, must move axially through openings formed in the levers. The shift effort is increased still further if the margin of the openings of the shift levers and the shift tube have any degree of wear.

In my improved mechanism I have provided a shift tube assembly that is isolated from the shift levers. The shift levers are mounted on a relatively stationary portion of the chassis rather than on the shift tube. They are mounted for oscillating motion about their pivotal axis in such a way that the resistance to axial shifting movement of the shift tube that is associated with them is not affected.

Another characteristic of my invention is the gate structure located adjacent the shift levers. In prior art systems the gate structure is situated at the upper end of the steering column within the passenger compartment. Due to tolerance in the shift linkages, especially in installations where the gate structures are displaced a substantial distance from the shift levers, the movement of the ratio changing elements of the transmission is not in synchronism with the movement of the shift tube. This problem becomes particularly aggravated after the shift linkage system becomes worn due to continued usage. This problem is overcome in my improved system, however, since the gate structure is located directly adjacent the shift levers and is connected directly to a stationary portion of the chassis so that the neutral position of the levers is precisely defined with respect to a fixed point on the chassis. This point does not change in location due to tolerance variations or wear.

BRIEF DESCRIPTION OF THE FIGURES OF THE DRAWINGS

FIGURE 4 is a detailed view, partly in section, of an actuator that is carried at the lower end of the shift tube shown in FIGURE 1;

FIGURE 5 is an end view of the structure of FIGURE 4 as seen from the plane of section line 5—5 of FIGURE 4;

FIGURE 6 shows a bushing for supporting the shift tube at the lower end of the steering column assembly;

FIGURE 6A is a plan view taken along the plane of section line 6A—6A of FIGURE 6;

FIGURE 7 is an end view of a gate element used in the assembly of FIGURE 1;

FIGURE 8 is a view of a washer that is used in the lever assembly at the lower end of the steering column of FIGURE 1;

FIGURE 9 shows the low-and-reverse shift lever situated at the lowermost portion of the steering column in FIGURE 1;

FIGURE 10 shows the intermediate and high shift lever situated on the right-hand side of the low-and-reverse lever of FIGURE 9 in the assembly of FIGURE 1;

FIGURES 11 and 11A show gate inserts for use with the gate structure of FIGURE 7;

FIGURES 12 and 12A show the mode of operation of the actuator of FIGURE 4 with the shift lever of FIGURES 9 and 10; and FIGURE 13 is an exploded assembly view of the lower end of the steering column of FIGURES 1 and 2.

PARTICULAR DESCRIPTION OF THE INVENTION

Figure 1:
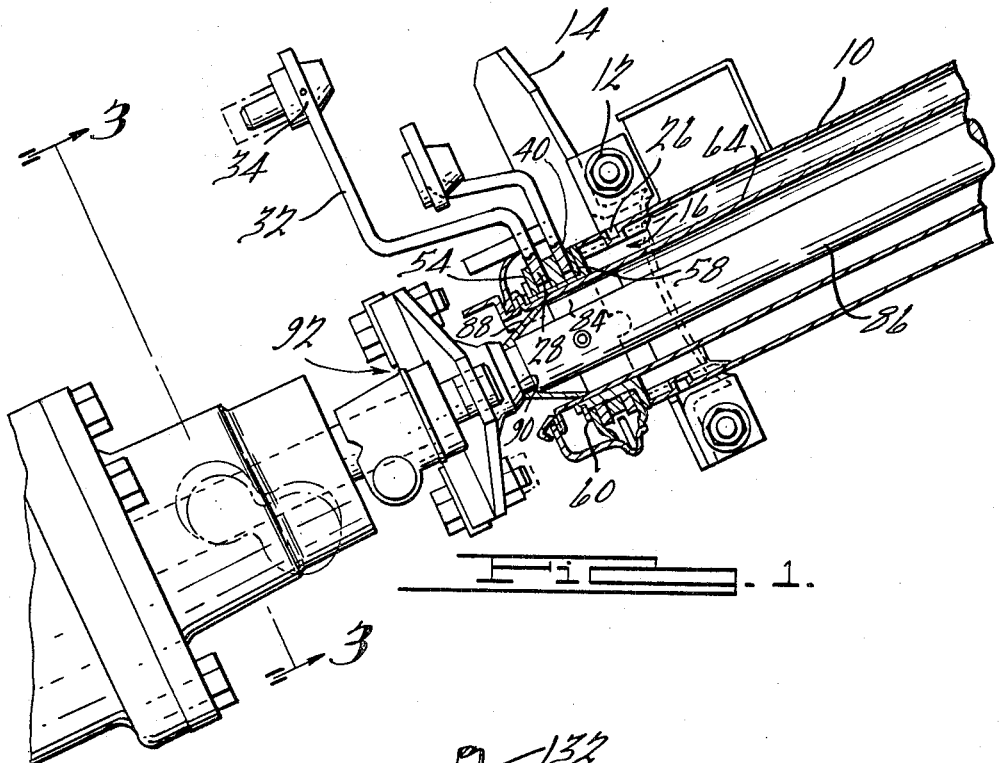
FIGURE 1 shows in longitudinal cross-sectional form the lower end of a steering column assembly for an automotive vehicle.

In FIGURE 1 numeral 10 designates a steering column assembly housing. It is mounted by means of suitable bracket structure 12 to the vehicle chassis structure shown in part at 14. It is mounted also at an intermediate location on the dash structure of the chassis within the vehicle passenger compartment.

Located within the lower end of the housing 10 is a bearing, which is best indicated at 16 in FIGURE 6. It comprises a large diameter portion 18 and a smaller diameter portion 20. The large diameter portion 18 is fitted within the end of the housing 10.

FIGURE 6A shows the outer surface of the portion 18, which is formed with transversely disposed grooves or recesses 22 and 24. At the point of intersection of these grooves 22 and 24 the housing 10 is deformed, as indicated at 26 in FIGURE 1. This locks the bearing 16 with the end of the housing 10 in fixed relationship.

The shift levers are shown in FIGURES 9 and 10. The lever that controls shifting between neutral and the first speed ratio and between neutral and the reverse speed ratio is shown in FIGURE 9. The corresponding shift lever for controlling ratio shifts between the neutral and the intermediate speed ratio is shown at FIGURE 10.

The shift lever of FIGURE 9 includes a hub 28, which defines an eyelet. A central opening 30 of the eyelet provides a bearing surface for the lever. The lever includes an arm 32 which is connected at its radially outer extremity 34 to a transmission shift linkage. A shoulder 36 is formed on one side of the arm 32 at a location relatively close to the eyelet 28, and a corresponding shoulder 38 is formed on the opposite side of the arm. The purpose of these shoulders will be explained with reference to FIGURES 12 and 12A.

The intermediate-and-high lever of FIGURE 10 includes an eyelet 40 which defines a bearing opening 42. The lever includes an arm 44 which is adapted to be connected at its outer extremity 46 to a control lever for conditioning the transmission for intermediate and high speed ratio operation. A pair of shoulders 48 and 50 is situated on either side of the arm 44. These correspond in function to the shoulders 36 and 38 of the FIGURE 9 construction.

The eyelets 28 and 40 for the shift levers of FIGURES 9 and 10 encircle the reduced diameter portion 20 of the bearing member 16. This member includes a groove 52 extending in an axial direction. The washer in FIGURE 8 surrounds the reduced diameter portion 20 adjacent the shift lever eyelet 28. It is identified by reference character 54. A key 56 on the inner periphery of the washer 54 registers with the groove 52 thereby holding the washer 54 against rotation about the axis of the member 16. A corresponding washer 58 is situated adjacent eyelet 40.

A snap ring 60 holds the levers and the washers in stacked relationship, as indicated in FIGURE 1, with the washer 58 engaging annular shoulder 62 at the juncture of the large diameter portion 18 and the smaller diameter portion 20 for the member 16.

The shift tube 64 is slidably situated within the bearing member 16. An actuator shell, as indicated best in FIGURE 4 at 66, is carried at the lower end of the shift tube 64. The tube 64 is in the form of a shell with a central opening 70, the margin of which is formed with a series of tabs displaced from the plane of the shell 66 as indicated at 72. These tabs bite into the end of the shift tube when the latter is folded back over the margin of the opening 70 in the actuator 66. This forms a permanent connection between the actuator and the shift tube, and it is not necessary to use a welded joint. The outer margin of the shell 66 is deformed to define a double thickness as indicated at 74 in FIGURE 4. One portion of the shell 66 is deformed inwardly to define a tab or actuator key 76.

At a location displaced 180° away from the tab 76 is a peripheral slot which defines two shoulders 80 and 82 in tangential displacement with respect to each other. The margin of the shell 66 is cut away as indicated in FIGURE 4 at 85. The width of the slot between shoulders 80 and 82 is sufficient to enable the shell 66 to be shifted across the plane of the shift levers with the shoulders 80 and 82 straddling the sides of the arms 32 and 44, respectively.

A seal 84 surrounds the steering shaft, the latter being shown in FIGURE 1 at 86. Seal 84 engages the inner surface of the shift tube 64. It is held in place by a seal retainer 88 which surrounds the shaft 86. A groove 90 in the shaft 86 receives the inner margin of the retainer 88. The retainer 88 is in the form of a cone, the major diameter margin of which engages the inside of the tube 64.

The shaft 86 is connected at its lowermost end to a coupling mechanism that is illustrated generally by reference character 92 to the torque input element of the steering gear system.

A gate plate is provided at 94, as shown in FIGURE 7. It includes a key 96 on its inner periphery which engages the previously described axial groove 52 in the bearing member 16. Shown in FIGURE 6. The gate plate 94 is in the form of an arcuate recess 98 which defines two shoulders 100 and 102 peripherally displaced with respect to each other. Directly adjacent shoulder 102 is an annular opening 104 in the plate 94. A corresponding annular opening 106 is formed adjacent shoulder 100. Received within the openings 104 and 106 are inserts, one of which is shown in FIGURE 11. This insert comprises a rectangular portion 108 on which is carried a cylindrical portion 110. The cylindrical portion is situated directly adjacent the shoulders 102 and 100. This reduces the arcuate extent of the recess 98 so that its effective width is defined by the rounded shoulders 112 and 114 on the inserts.

The tab 76 for the actuator shell 66 is adapted to pass through the arcuate recess 98 when the actuator shell is positioned in a so-called neutral position. The rounded shoulders 112 and 114 facilitate passage of the tab 76 through the so-called arcuate recess 98, which serves as a gate opening.

If the shift tube 64 is moved in a right-hand direction, as viewed in FIGURE 1, its motion in that direction is limited by the tab 76 as it engages the washer 58. When it assumes the position that is defined by the washer 58, the shoulders 80 and 82 on the actuator shell 66 are situated in the plane of the arm 44. As the actuator shell is rotated about the axis of the steering shaft upon rotation of the shift tube 64, the arm 44 will rotate in one direction or the other depending upon the direction of rotation of the shift tube 64. As this occurs, the arm 32 of the intermediate-and-high shift lever registers with the arcuate opening 85 in the shell 66. Thus interference with this shift lever is avoided when the shift lever 44 is actuated.

Before the shift tube 64 can be shifted in a left-hand direction, it is necessary to return the intermediate-and-high shift lever to the neutral position. It is only at that time that the tab 76 on the actuator shell 66 will register with the gate opening 98 for the gate plate 94. Once having assumed the neutral position for the intermediate-and-high shift lever, the tube 64 can be shifted in a left-hand direction until the shoulders 80 and 82 become aligned with the plane of the low-and-reverse shift lever arm 32. Upon subsequent rotation of the tube 64 about its axis, the arm 32 can be rotated in one direction or the other.

The shoulders 80 and 82 cannot be shifted out of engagement with the arm 32 until the shell 66 is moved to the neutral position. This will permit the tab 76 of the shell 66 to pass through the gate opening 98. The shoulders 80 and 82 thus become aligned with the intermediate-and-high shift lever arm 44.

The gate opening 98 is fixed with respect to the chassis. Thus the crossover point, and hence the neutral position for the shift lever, is fixed regardless of tolerance variations that may exist in the elements of the gear shift linkage and regardless of the degree of wear in the linkage that connects the arms 32 and 44 with the ratio changing elements of the transmission mechanism.

There is no friction due to the engagement of the shift tube 64 with the openings in the eyelet portions 40 and 28 of the shift levers. Thus the shift effort required to shift the tube 64 in an axial direction, as well as the shift effort required to rotate it during a ratio change, is minimal.

The margins of the shell 66 that define the shoulders 80 and 82 are subject to bending if the shifting torque is severe. To prevent deflection of the shell 66 beyond the elastic limit, I have provided shoulders 36 and 38 on the arm 32 and have provided shoulders 48 and 50 on the arm 54. These cooperates with the shell 66, as indicated at FIGURES 12 and 12A. If the shifting effort, for example, should exceed a predetermined value, the shell 66 will tend to deform from the position shown in FIGURE 12 to the position shown in FIGURE 12A. Before reaching the elastic limit for the material of which shell 66 is formed, the periphery of the shell 66 will engage the particular shoulder on the shift lever arm with which it is in alignment. This prevents further deflection of the periphery of the shell 66 beyond the elastic limit. It permits also continued torsion of the shift tube to any torque value necessary to overcome the detent force for the ratio changing elements in the transmission system.

Although I have shown my invention with a conventional steering column, I expect that the shift levers can be located remotely from the steering column on a fixed portion of the chassis. Regardless of whether they are located on the fixed portion of the column or on some other fixed portion of the chassis, they would be independently mounted for oscillation with respect to the shift tube.

Figure 2:
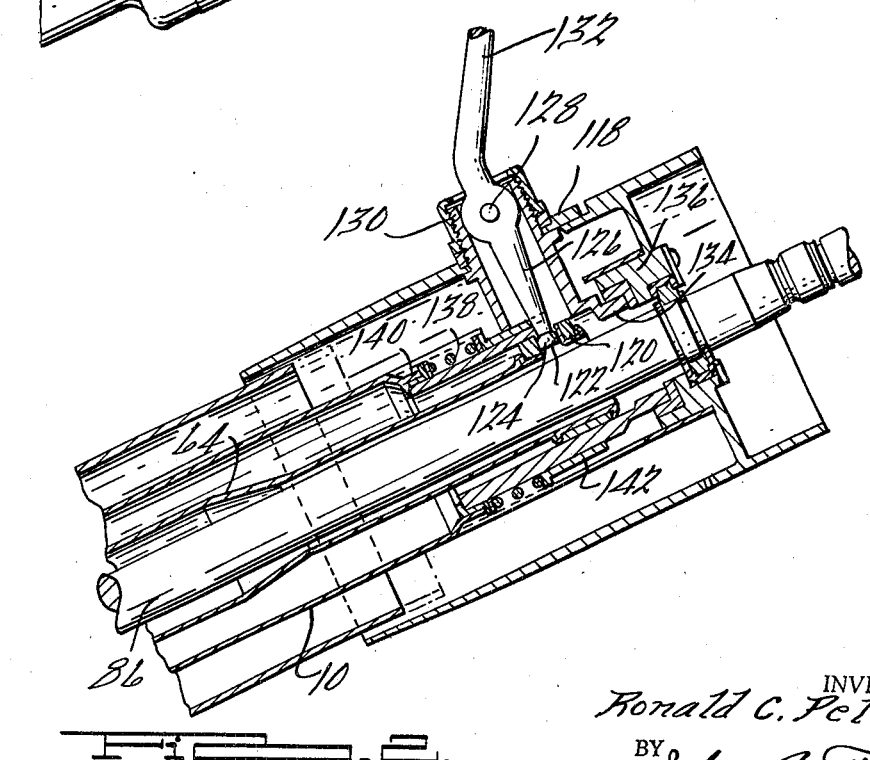
FIGURE 2 shows the upper end of the steering column assembly of FIGURE 1 in longitudinal cross-sectional form.
Figure 3:
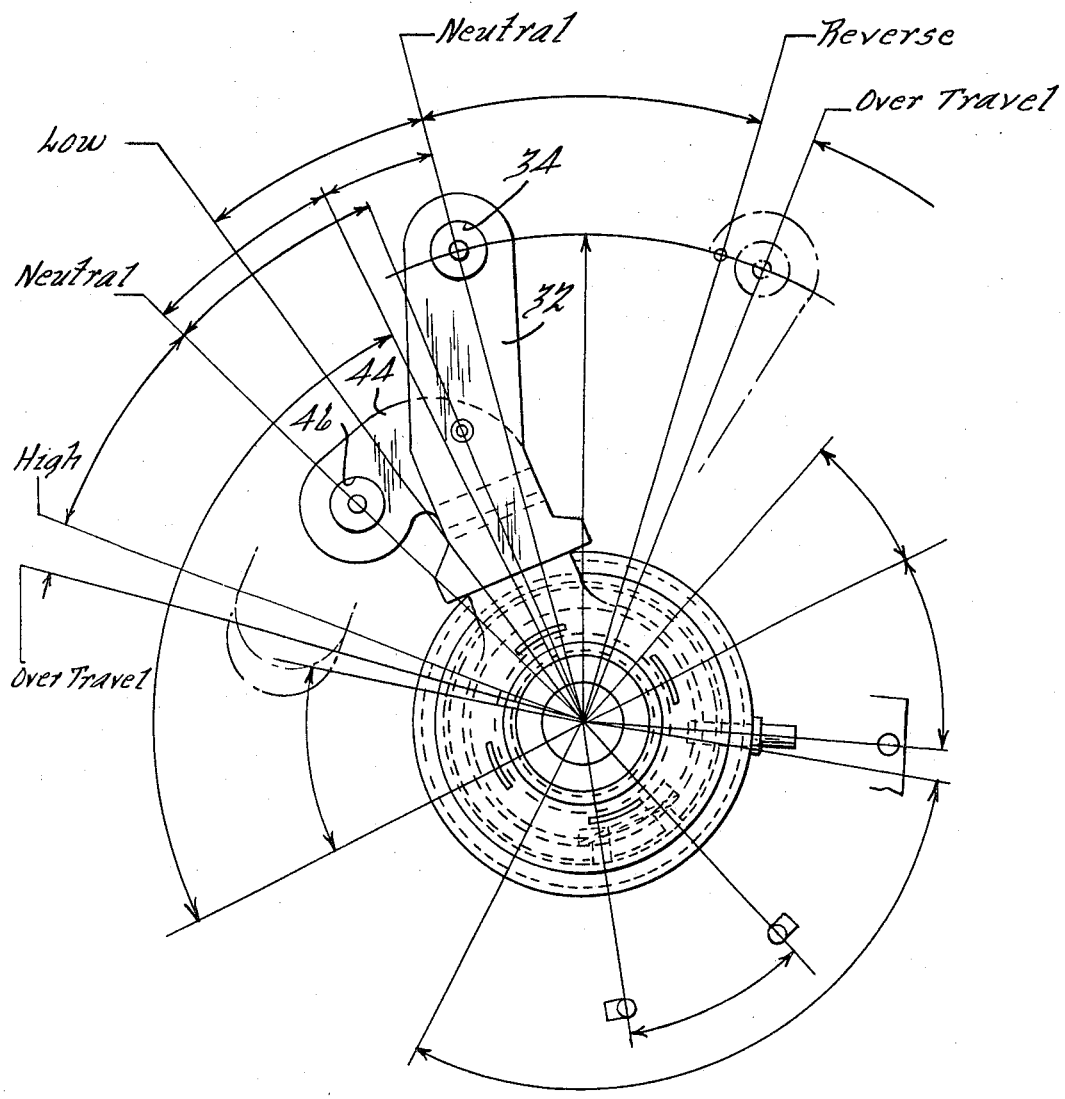
FIGURE 3 is an end view of the structure of FIGURE 1 taken along the plane of section line 3—3 of FIGURE 1.

The mechanism for rotating and shifting axially the shift tube 64 is indicated in FIGURE 2. It comprises a housing 118 located in the vehicle passenger compartment as part of the steering wheel hub structure. The steering wheel is secured to the upper end of the shaft 86. The upper end of the shift tube 64 carries a collar 120 having an opening 122 which receives the crowned end 124 of a lever 126. The lever 126 is pivoted at 128 to a tower portion 130. The lever 126 extends outwardly, as shown in 132, where it can be gripped by the vehicle operator.

The tower structure 130 includes a hub 134 which is mounted for oscillation within the relatively stationary housing portion 136. The collar 120 can be shifted axially within the tower structure 130. As the tower 130 is rotated about the axis of the shaft 86, the shift tube 64 is rotated. On the other hand, if the vehicle operator moves the lever portion 132 about the axis of the pivot 128, the tube 64 will be shifted axially. The lever portion 132 normally is biased to an inoperative position away from the vehicle operator by a spring 138, which is anchored against the boss 140 in the tubular housing 10.

The end of the spring 138 acts on the sleeve 142 which slides over the hub 134 of the tower. As it does this, it engages the radially inward end of the lever 126. The force of the spring 128 must be overcome by the operator before he can shift the tube in a left-hand direction as viewed in FIGURE 2.

Having thus described a preferred form of my invention, what I claim and desire to secure by U.S. Letters Patent is:

1. In a remote control for a multiple ratio power transmission mechanism in an automotive vehicle driveline, said driveline including a relatively stationary chassis portion, a shift lever, means for mounting said shift lever for oscillation about a pivotal axis on said stationary chassis portion, a gate operatively connected to said stationary portion in fixed relationship therewith and situated abjacent said shift lever, a shift tube extending through said shift lever, an actuator carried by the end of said shift tube and including actuator portions extending to a location adjacent the plane of oscillation of said shift lever, a gate opening formed in said gate and a positioning element connected to said actuator, said positioning element being adapted to register with said gate opening when said shift tube is rotated to permit axial alignment between said positioning element and said gate opening, said actuator being engageable with said shift lever as the shift tube is rotated about its axis.

2. The combination as set forth in claim 1 wherein said shift levers have formed thereon shoulders directly adjacent said actuator portions when the latter are aligned with said shift levers, said actuator portions, upon deflection, engaging said shoulders thereby avoiding deflection of said actuator portions when said shift tube is subjected to a high shifting torque.

3. The combination as set forth in claim 2 wherein the gate opening in said gate has peripherally displaced shoulders which define the arcuate extent of said gate opening, said positioning element thereby being adapted to be moved into registry with the opening with a reduced degree of interference.

4. The combination as set forth in claim 2 wherein said stationary chassis portion comprises a tubular housing for a steering column assembly, said shift tube extending concentrically through said tubular housing from an upper region to a lower region, and means for anchoring said tubular housing to said stationary chassis portion, said shift levers being carried by said tubular housing with the axis of oscillation of said shift levers corresponding to the axis of said tubular housing.

5. The combination as set forth in claim 1 wherein said stationary chassis portion comprises a tubular housing for a steering column assembly, said shift tube extending concentrically through said tubular housing from an upper region to a lower region, and means for anchoring said tubular housing to said stationary chassis portion, said shift levers being carried by said tubular housing with the axis of oscillation of said shift levers corresponding to the axis of said tubular housing.

6. In a remote control for a multiple ratio power transmission mechanism in an automotive vehicle driveline, said driveline including a relatively stationary chassis portion, a pair of shift levers including an arm portion, said arm portion being adapted to be connected to ratio controlling elements of said transmission mechanism, means for journalling said shift levers for oscillation about a common axis on said stationary chassis portion, a shift tube extending through said shift levers, a gate operatively connected to said chassis portion and extending radially between said shift levers, said gate having a gate opening at one angular position, a positioning element operatively connected to said shift tube and adapted to move through said gate opening when said shift tube is rotated until said gate element is in alignment with said opening, an actuator comprising a pair of actuator portions carried by said shift tube, said actuator portions being adapted to straddle each of said levers as the shift tube is moved from one axial position to the other whereby said shift levers can oscillate about their axes upon rotation of said shift tube.

7. The combination as set forth in claim 6 wherein said shift levers have formed thereon shoulders directly adjacent said actuator portions when the latter are aligned with said shift levers, said actuator portions, upon deflection, engaging said shoulders thereby avoiding deflection of said actuator portions when said shift tube is subjected to a high shifting torque.

8. The combination as set forth in claim 7 wherein the gate opening in said gate plate has peripherally displaced shoulders which define the arcuate extent of said gate opening, said positioning element thereby being adapted to be moved into registry with the opening with a reduced degree of interference.

9. The combination as set forth in claim 7 wherein said stationary chassis portion comprises a tubular housing for a steering column assembly, said shift tube extending concentrically through said tubular housing from an upper region to a lower region, and means for anchoring said tubular housing to said stationary chassis portion, said shift levers being carried by said tubular housing with the axis of oscillation of said shift levers corresponding to the axis of said tubular housing.

10. The combination as set forth in claim 6 wherein said stationary chassis portion comprises a tubular housing for a steering column assembly, said shift tube extending concentrically through said tubular housing from an upper region to a lower region, and means for anchoring said tubular housing to said stationary chassis portion, said shift levers being carried by said tubular housing with the axis of oscillation of said shift levers corresponding to the axis of said tubular housing.

References Cited

UNITED STATES PATENTS

| | | | |
|---|---|---|---|
| 2,875,637 | 3/1959 | Gurney et al. | 74—484 |
| 3,121,344 | 2/1964 | Fodrea | 74—484 X |

MILTON KAUFMAN, Primary Examiner